No. 885,207. PATENTED APR. 21, 1908.
A. W. WHITCOMB.
VARIABLE SPEED DRIVING MECHANISM.
APPLICATION FILED MAY 22, 1905.
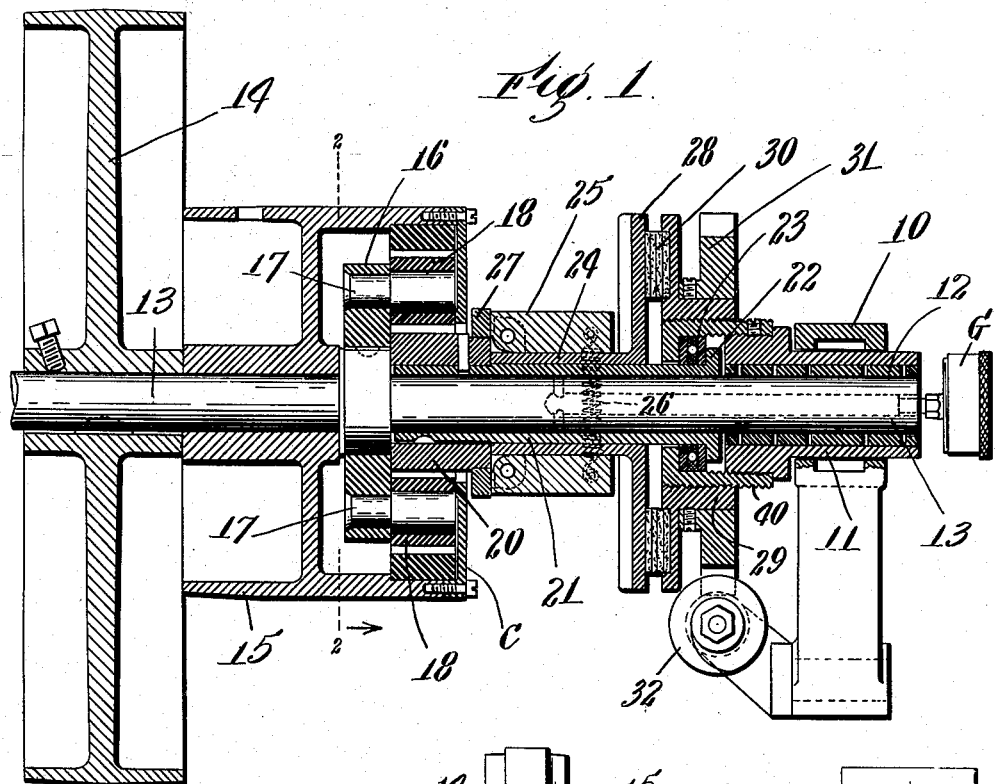
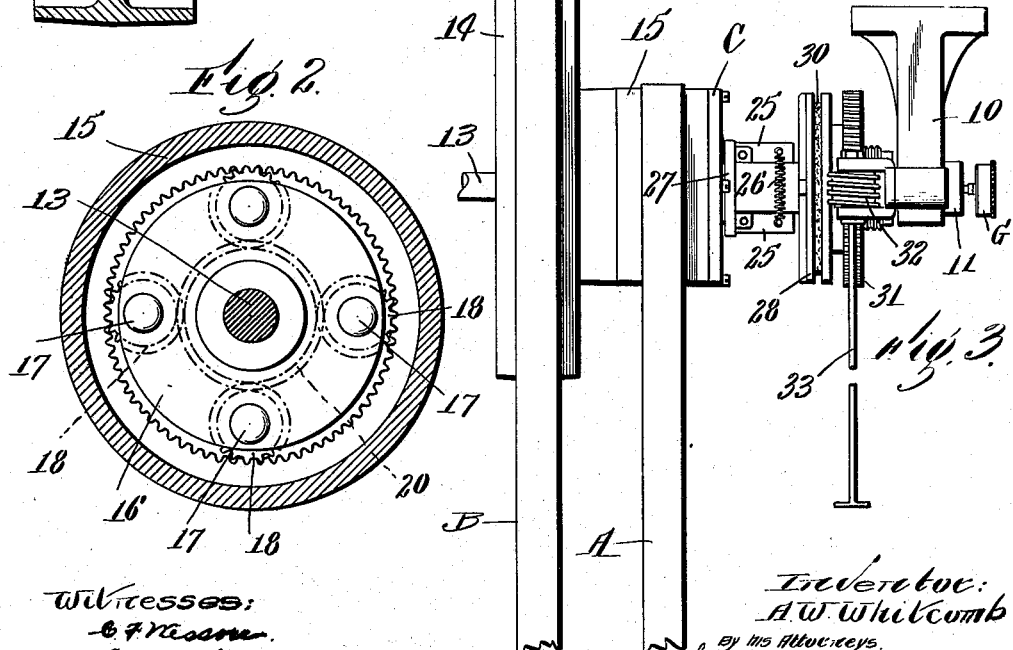

UNITED STATES PATENT OFFICE.

ALONZO W. WHITCOMB, OF WORCESTER, MASSACHUSETTS.

VARIABLE-SPEED DRIVING MECHANISM.

No. 885,207.

Specification of Letters Patent.

Patented April 21, 1908.

Application filed May 22, 1905. Serial No. 261,521.

*To all whom it may concern:*

Be it known that I, ALONZO W. WHITCOMB, a citizen of the United States, residing at Worcester, in the county of Worcester and State of Massachusetts, have invented a new and useful Variable-Speed Driving Mechanism, of which the following is a specification.

This invention relates to a variable speed mechanism which is designed for transmitting different speeds to parts which are to be driven.

The especial object of this invention is to provide a variable speed mechanism in which the speeds transmitted are controlled by a centrifugal governor which can be adjusted to produce a variety of speed changes.

To these ends, this invention consists of the variable speed mechanism and of the combinations of parts therein as hereinafter described and more particularly pointed out in the claims at the end of this specification.

The accompanying drawing shows the invention applied to an overhead countershaft having driving pulleys for operating a metal planer.

In the drawing, Figure 1 is a sectional plan view of sufficient parts of an overhead counter-shaft to illustrate the application of this invention thereto. Fig. 2 is a sectional view taken on the line 2—2 of Fig. 1, and Fig. 3 is a side view of the construction.

In operating many machines and particularly in operating metal working tools, it is desirable that provision should be made for varying the speeds of operation according to the work that is to be performed. This is especially true of metal working tools, for the reason that the tools themselves are now often made of air-hardening steels which can be used successfully at much higher speeds than cutting tools of ordinary tool steel.

A considerable number of variable speed counter-shafts and variable speed driving mechanisms are already in use for driving metal working tools at variable speeds and for other purposes. Most of such constructions, however, are limited to comparatively few speed changes, and the setting of such devices is sometimes a work of comparative difficulty.

The especial object of this invention is to provide a variable speed mechanism which can be readily and simply adjusted to produce a great variety of speed changes.
This object is accomplished by the use of a construction having its operation controlled by a centrifugal friction governor mechanism, and by adjusting the governor mechanism, to permit the transmission of the desired speeds.

A variable speed mechanism may be constructed according to this invention comprising the driving shaft which is turned from any suitable source of power; the pulley or other part which is to be driven; the governor mechanism and a planetary system of gearing between the governor mechanism and the pulley or part which is to be driven. That is to say; the connection between the governor mechanism and the pulley or other part to be driven comprises an internal gear on one of said parts, an external gear on the other of said parts, and one or more intermediate gears revolved by the driving shaft and interposed between the internal gear and the external gear.

Referring to the accompanying drawing for a detail description of one form of apparatus embodying this invention, 10 designates a shaft-hanger bracket. Fastened in the bracket 10 is a bearing box 11 which is preferably lined with an anti-friction bushing 12. Journaled in the anti-friction bushing 12 and supported at its other end in any suitable bearing is the driving shaft 13. Fastened upon and turning with the driving shaft 13 is a large pulley 14. The bearing of the shaft 13 may be lubricated by an ordinary grease-box G.

The construction illustrated is intended to be used as a counter-shaft for a metal planer, and the large pulley 14 carries a belt B which will drive the planer-table on its return stroke with a quick speed return motion, the diameter of the pulley 14 being large enough to impart the highest return speed to the planer table which can be used with safety.

Mounted loosely on the shaft 13 is a pulley 15 which is to be driven. The pulley 15 as shown in Fig. 3, is connected by a belt A to give the planer table a variety of cutting speeds according to the work which is to be done. The pulley 15 to be driven is provided with an internal gear which is held in place by a cover-plate C.

Fastened to a collar on the driving shaft 13 is a disk 16. Riveted into the disk 16 are a number of pins 17 (in the present instance, four), and journaled on the projecting ends of the studs or pins 17 are four intermediate gears 18 which are revolved by the driving shaft. Journaled loosely on the shaft 13 is a sleeve 21, and keyed onto the sleeve 21 is an external gear 20 which meshes with and engages the intermediate gears 18. The sleeve 21 is provided at its other end with a head 22 inclosed in a thimble 40 threaded onto the box 11.

The action of the governor to be hereinafter referred to, tends to draw the head 22 away from the box 11 and to receive this thrust, I provide a ball-bearing 23 which may be of the ordinary or usual thrust type of ball bearing. Turning with the sleeve 21 and longitudinally movable thereon is the governor shifted sleeve 24, and pivoted in ears on the governor-shifted sleeve 24 are governor weights 25 which are held in normal position by springs 26. The governor weights 25 at the other sides of their pivots rest against a wearing ring 27 mounted on the external gear 20. The governor-shifted sleeve 24 is provided with a friction disk 28 engaging a friction surface 30 carried by a coöperating disk 29 adjustably threaded on the thimble 40. Mounted on the hub of the friction disk 29 is a worm-wheel 31 which engages with and can be turned by a vertical worm 32 carried by a vertical adjusting shaft 33.

In the operation of the complete device, the speed of the pulley 15 depends upon the speed of rotation of the external gear 20. For example, if the disk 31 is adjusted to permit the external gear 20 to revolve at the same speed as the shaft 13, the intermediate gears 18 revolving in unison with the external gear will serve simply to lock the internal and external gears together, so that the speed of the pulley 15 to be driven will be the same as that of the shaft 13. When a higher speed is desired, the worm will be turned to tighten the engagement between the friction disks, and the centrifugal governor will then act to slow down the speed of the external gear 20 so that as the intermediate gears 18 are revolved they will also be turned or rotated and will transmit a higher speed to the pulley 15. When lower speeds are desired, the pressure between the friction disks will be lessened, so that the centrifugal governor will permit a higher speed of rotation of the external gear 20, tending to counteract the driving effects of the revolving intermediates 18, so that a lower resultant speed will be transmitted to the pulley 15.

In practice I have found that in the use of a variable speed mechanism as thus constructed, I am enabled to drive metal-working tools or other machines so that the same may be given any desired speeds of operation; changes of speed can be effected very readily; adjustments of speed can be made with any desired degree of accuracy; and operating speeds will be maintained in spite of variations of speed of the driving shaft.

I am aware that changes may be made by skilled mechanics in the use of my invention, and that devices constructed according to my invention may be used for many other purposes besides that of driving metal planing machines.

I do not wish, therefore, to be limited to the construction I have herein shown and described, but What I do claim and desire to secure by Letters Patent of the United States is:—

1. In a variable speed mechanism, the combination of a driving shaft, a part to be driven, means for automatically governing the speed of the part to be driven, and a planetary system of gearing comprising a primary gear turning with the governing means, a gear connected with the part to be driven, and an intermediate gear revolving with the driving shaft and meshing with both of the other two gears.

2. In a variable speed mechanism, the combination of a part to be driven, a driving part, planetary gearing connecting them comprising a gear, a sleeve rotatable with respect to both the driving and driven parts on which said gear is fixed, a sleeve slidable on the first named sleeve, a governor having means for moving said slidable sleeve longitudinally in accordance with the speed of rotation, a friction member fixed with respect to said slidable sleeve, and a stationary friction member adapted to engage said friction member on the sleeve.

3. In a variable speed mechanism, the combination of a shaft, a pulley loosely mounted thereon, a sleeve loosely mounted on the shaft, a governor mechanism comprising a stationary friction member, a rotary friction member on the sleeve, and an automatic governor tending to press the rotary friction member into engagement with the fixed friction member, a gear connected with the pulley, a gear connected with the sleeve, and an intermediate gear revolved by the shaft and meshing with both of the other gears.

4. In a variable speed mechanism, the combination of a shaft, a pulley loosely mounted thereon, a sleeve loosely mounted thereon, a governor mechanism comprising a stationary friction-disk, a rotating friction disk on the sleeve, and spring-retracted governor weights tending to press the rotating friction-disk into engagement with the fixed friction-disk, an internal gear in the pulley, an external gear upon the sleeve, and an intermediate gear revolved by the shaft and meshing with both the internal gear and the external gear.

5. In a variable speed mechanism, the combination of a shaft, a pulley loose on the shaft, a sleeve loose on the shaft, an adjustable governor mechanism controlling the speed of rotation of the sleeve comprising a stationary friction-disk, means for adjusting the stationary friction disk laterally, a friction-disk turning with the sleeve, and spring-retracted governor weights for pressing the friction-disks together, an internal gear in the pulley, an external gear on the sleeve, and an intermediate gear revolving with the shaft and meshing with both the internal and external gears.

6. In a variable speed mechanism, the combination of a shaft, a pulley loose thereon, a sleeve loose thereon, a governor mechanism controlling the speed of rotation of the sleeve, comprising a stationary friction-disk threaded onto a fixed support, a worm-wheel and shaft for turning said friction-disk to adjust the same laterally, a friction disk turning with the sleeve, and spring-retracted governor weights for pressing the friction-disks together, an internal gear turning with the pulley, an external gear turning with the sleeve, and a plurality of intermediate gears revolved by the shaft and each meshing both with the internal gear and the external gear.

7. In a variable speed mechanism, the combination of a shaft, a pulley loose thereon, a sleeve loose on the shaft, a governor mechanism controlling the speed of rotation of the sleeve comprising a stationary friction member, a fixed support on which said friction member is threaded, a worm wheel and shaft for turning said friction member to adjust the same laterally, a friction member turning with the sleeve, and a governor for pressing said friction members together, and a system of planetary gearing for connecting the pulley with the sleeve, one of the members of the gearing being connected with the shaft.

8. In a variable speed mechanism, the combination of a shaft, a pulley loose thereon, a sleeve loose on the shaft, an adjustable governor mechanism controlling the speed of rotation of the sleeve comprising a stationary friction member, means for adjusting said friction member laterally, a friction member turning with the sleeve, and a governor for pressing said friction members together, and planetary gearing connecting the pulley and sleeve, and comprising an intermediate gear revolving with the shaft.

9. In a variable speed mechanism, the combination of a part to be driven, a driving part, planetary gearing connecting them comprising a gear, a sleeve rotatable with respect to both the driving and driven parts on which said gear is fixed, a sleeve slidable on the first named sleeve, a governor having means for moving said slidable sleeve longitudinally in accordance with the speed of rotation, a friction member fixed with respect to said slidable sleeve, a stationary friction member adapted to engage said friction member on the sleeve, said stationary friction member being adjustable, and manually controlled means for adjusting it toward and from the friction member of the sleeve independently of the operation of said governor.

10. In a variable speed device, the combination of a driving member, a driven member, means for transmitting motion from one member to the other, a sleeve rotatable with respect to both of said members and connected with the transmitting means, a sleeve slidable on the first named sleeve, a governor having means for moving said slidable sleeve longitudinally in accordance with the speed of rotation, a friction member movable with the sliding sleeve, a second friction member adapted to engage the first friction member, and manually controlled means for adjusting the second friction member toward and from the first friction member.

In testimony whereof I have hereunto set my hand, in the presence of two subscribing witnesses.

ALONZO W. WHITCOMB.

Witnesses:
   PHILIP W. SOUTHGATE,
   MARY E. REGAN.